Aug. 30, 1966  S. G. ENDERS  3,269,197
VARIABLE MOTION JIG SAW

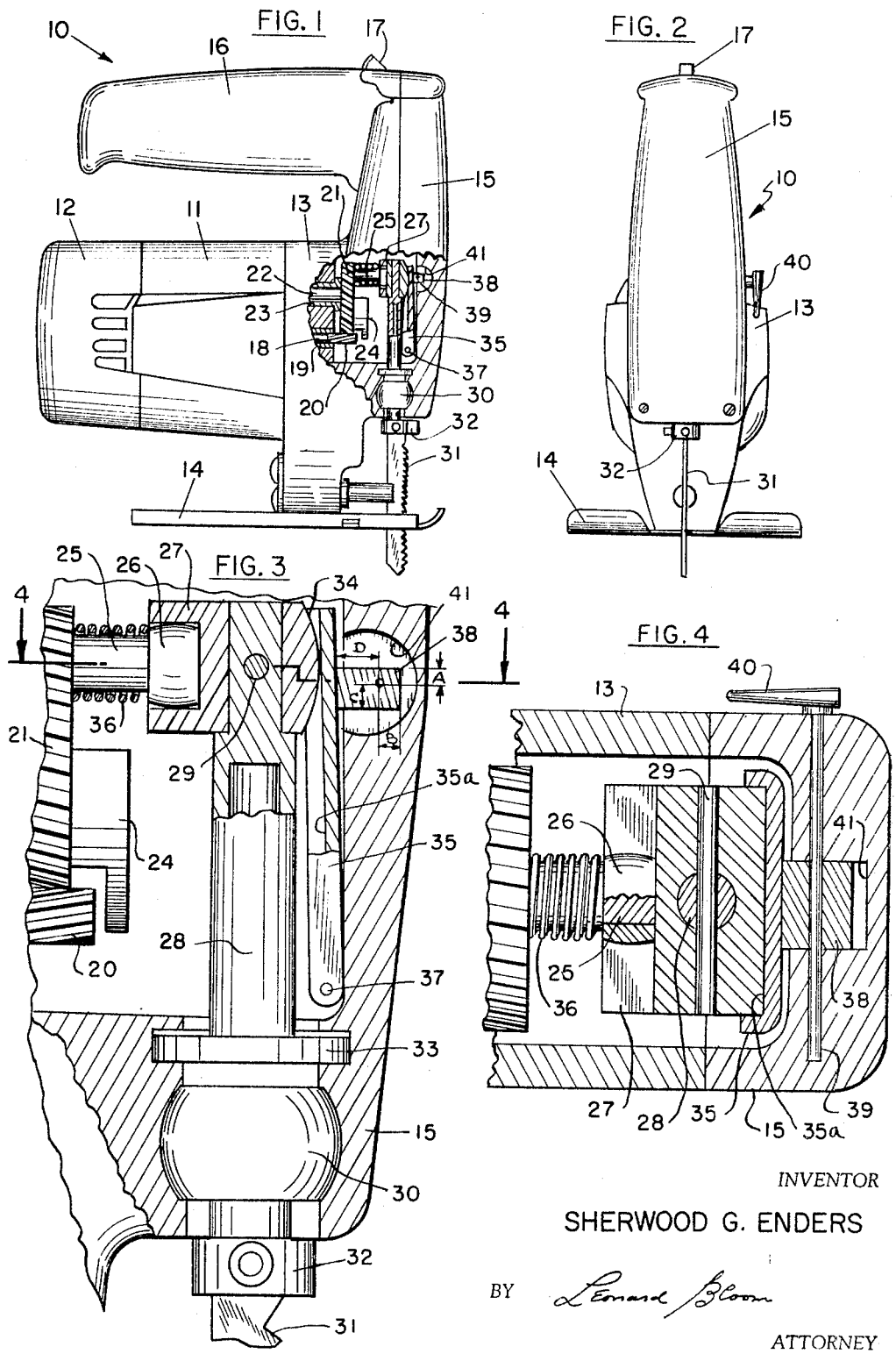

Filed July 24, 1963  2 Sheets-Sheet 2

INVENTOR
SHERWOOD G. ENDERS

BY *Leonard Bloom*

ATTORNEY

United States Patent Office 3,269,197
Patented August 30, 1966

3,269,197
VARIABLE MOTION JIG SAW
Sherwood G. Enders, Bowley's Quarters, Md., assignor to The Black and Decker Manufacturing Company, Towson, Md., a corporation of Maryland
Filed July 24, 1963, Ser. No. 297,377
3 Claims. (Cl. 74—50)

The present invention relates to a variable motion jig saw, and more particularly, to a jig saw having manually-manipulatable means to change the reciprocation or stroke of its blade from linear to arcuate, and vice-versa.

In the prior art of which I am aware, various portable electric jig saws or saber saws have been produced and marketed, wherein the saw blade has a reciprocation or stroke which falls within one of the following three categories: one, a linear motion, sometimes referred to in the art as "straight up-and-down" motion; two, an orbital or elliptical motion, such that the saw blade "backs away" from the work on its non-cutting or return stroke; and three, an arcuate motion, in effect a hybrid between the other two, which is concave when viewed towards the direction of cut, and which follows substantially the same path on its upstroke as on its downstroke.

Generally, there are advantages and disadvantages to each. The straight reciprocating type of jig saw, as compared to the other types, is simpler and more economical to build, it is more compact, it usually has less associated vibration, and it is capable of making more precise cuts, such as intricate scroll cuts, with less splintering of the top surface of the work material; but, on the other hand, it has slower cutting rates, it is not quite as rugged, and it is not as well suited as the other types for general purpose usage as a cut-off saw or a pocket-cutting saw. The orbital motion jig saws and to a certain extent the arcuate motion jig saws, when considered as a whole and compared to the straight reciprocating type, are generally heavier and more rugged, they are more versatile for general purpose usage, and they feature much faster cutting rates; but, on the other hand, they are invariably more complicated and hence more expensive to manufacture, they usually have more vibration and hence are more difficult to guide or to control, and also, they are not as well suited for the making of very precise or intricate scroll cuts, especially where the workpiece is veneered or laminated.

Accordingly, it is an object of the present invention to alleviate the aforementioned deficiencies of the prior art by providing a jig saw or similar power tool whose saw blade has a variety of motions, each of which may be conveniently selected at the discretion of the operator.

It is another object of the present invention to provide a variable motion jig saw which provides either a linear type of reciprocation or else an arcuate type of reciprocation, in combination with means to easily shift from one type to another.

It is yet another object of the present invention to provide a variable motion jig saw, wherein the motion of its reciprocating blade may be preselected for optimum performance of the particular type of cut intended.

It is yet still another object of the present invention to provide a variable motion jig saw which is inherently rugged and reliable, and which may be manufactured easily and economically.

In accordance with the broad, general teachings of the present invention, there is herein illustrated and described, a variable motion jig saw comprising a shaft ordinarily reciprocating in a linear path in combination with shiftable means to constrain the shaft to reciprocate in any one of a plurality of selectable arcuate paths, each of which is concave when viewed towards the direction of the cut being made in the work.

In accordance with the more specific teachings of the present invention, there is herein illustrated and described, a variable motion jig saw comprising a housing and a pivoted bearing retained within the housing, the bearing journaling a shaft which ordinarily reciprocates in a linear path. Selectable means are provided in the housing to constrain the shaft to reciprocate in an arcuate path which is concave when viewed towards the direction of the cut being made in the work, such that the bearing alternately pivots about an axis which is transverse to the axis of the shaft; and manually-manipulatable means are provided to engage the last-named selectable means to shift the path of the reciprocating shaft from linear to arcuate, and vice-versa.

These and other objects of the present invention will become apparent from a reading of the following specification, taken in conjunction with the enclosed drawings, in which:

FIGURE 1 is a side elevation of the variable motion jig saw of the present invention with parts broken away and sectioned to illustrate its construction;

FIGURE 2 is a front elevation of the variable motion jig saw of FIGURE 1, showing the shift lever which may be manipulated to change the motion of the reciprocating shaft from one type to another;

FIGURE 3 is an enlarged longitudinal section of a portion of FIGURE 1, further showing the details of construction;

FIGURE 4 is a section view taken along the lines 4—4 of FIGURE 3;

Figure 5A:
FIGURES 5a through 5d are sequence views showing the various types of blade motion produced by the present invention.

With reference to FIGURES 1 and 2, there is illustrated a hand-portable electric jig saw 10 with which the teachings of the present invention may find more particular utility; however, it will be appreciated by those skilled in the art that the present invention is equally applicable to other types of power-operated tools and devices, such as a reciprocating file, and that the essence of the present invention is not necessarily confined to the particular form of saw 10 illustrated in FIGURE 1. With this in mind, the portable electric jig saw 10 comprises a motor housing 11, an end cap 12, a gear case 13, a shoe structure 14 adapted to support the saw 10 upon the top surface of a workpiece, another housing 15 usually referred to in the art as a gear case cover, an overhead handle 16, and a switch 17 for energizing the jig saw 10.

With reference again to FIGURES 1 and 2, and with further reference to FIGURES 3 and 4, the motor housing 11 has a conventional electric motor (not shown) which has an armature shaft 18 journaled in a sleeve bearing 19; and a pinion 20 is formed on the shaft 18 for meshing engagement with a gear 21. The gear 21 is mounted on a jack shaft 22 which is journaled in a sleeve bearing 23, and a counterbalance 24 is carried by the gear 21. An eccentric or crank pin 25 is carried by the gear 21, and a spherical roller 26 is loosely fitted on the pin 25. The roller 26 is received within a transverse yoke member 27 which is secured to the reciprocating shaft 28 by means of a pin 29. The combination of the crank pin 25, roller 26, yoke 27, and shaft 28 comprises the well-known Scotch-yoke type of mechanism which converts the rotary motion of the gear 21 into the reciprocating motion of the shaft 28; however, it will be understood by those skilled in the art, that other types of motion-translating mechanisms are equally applicable. The shaft 28, which may ordinarily reciprocate in a linear path, is journaled in a pivoted bearing 30 which is trapped between the gear case 13 and the gear case cover 15, and a saw blade 31 is secured to the shaft 28 by means of a suitable clamp 32. The bearing 30 may be of any suitable type which will accommodate either linear or arcuate movement of the reciprocating shaft 28. Also, a fiber washer 33 is retained above the pivoted bearing 30 for grease sealing purposes.

With reference again to FIGURES 3 and 4, the forward portion of the yoke member 27 is formed with a rounded-off or cam surface 34 and is slidably received within a guide channel 35 (or other guide member) which is pivoted at its lower end to the gear case cover 15 by means of a stationary pin 37. The yoke member 27 is urged into engagement with the guide channel 35 by means of a spring 36 which is disposed around the crank pin 25, and also, by means of the leverage exerted about the axis of the pivoted bearing 30 when the jig saw 10 is brought into engagement with a workpiece. A block 38 (having a plurality of sides or faces) engages the back of the channel 35, and the block 38 is secured to a pin 39, which is journaled for pivoting movement in the gear case cover 15; the axis of the pin 39 is substantially parallel to the axis of the pin 37 for the channel 35. The pin 39 protrudes beyond the gear case cover 15, see FIGURES 2 and 4, and a lever 40 or other manually-manipulatable shift means is secured thereto. As shown more particularly in FIGURE 3, the pin 39 is eccentrically disposed within the block 38 such that the distances from the center or axis of the pin 39 to each of the sides of the block 38 are slightly different from each other; these distances are denoted by the numerals A, B, C, and D, and as noted, $A<B<C<D$. The block 38 is adapted to be pivoted or rotated about the axis of the pin 39 by means of the lever 40, and a suitable recess 41 is provided in the gear case cover 15 to accommodate the pivoting movement of the block 38. The faces of the block 38 are thus selectably engageable against the back of the guide channel 35 in order to move the channel 35 into a number of positions corresponding to the number of faces or sides of the block 38, and obviously, the block 38 may be provided with any number of sides, as desired, in order to facilitate any number of paths exhibited by the reciprocating shaft 28. Moreover, the combination of the block 38, pin 39, lever 40, and recess 41 comprises merely one form of manually-manipulatable shift means that may be used in conjunction with the teachings of the present invention.

Figure 5B:
Figure 5C:
Figure 5D:

With reference to FIGURES 5a through 5d, the operation and inherent utility of the present invention may be more clearly understood. In FIGURE 5a, the block 38 is positioned such that the axis or trough 35a of the pivoted guide channel 35 is substantially parallel to the longitudinal axis of the reciprocating shaft 28. Consequently, the shaft 28 (to which the saw blade 31 is secured) will move in a straight up-and-down or linear path, as indicated by the small arrows, with the guide-channel 35 (and block 38) serving to guide or support the yoke 27 and prevent twisting of the shaft 28 about its axis. In FIGURE 5b, however, the block 38 is pivoted to the position shown, and the guide channel 35 is accordingly pivoted about its pin 37 and inclined, such that its axis or trough 35a is angularly offset or skewed with respect to the longitudinal axis of the reciprocating shaft 38 when the shaft is in its uppermost position, and such that their respective axes tend to converge towards each other in a direction away from the pivoted bearing 30. Consequently, the shaft 28 is constrained to reciprocate in an arcuate path (as indicated by the small arrows) which are concave when viewed towards the direction of the cut being made in the workpiece W; and insofar as the jig saw 10 is not being advanced into the work, this arcuate path is substantially the same on the upstroke or cutting stroke of the blade 31 as on its downstroke or non-cutting stroke. Moreover, and in order to accommodate the arcuate movement of the reciprocating shaft 28, the bearing 30 alternately pivots about an axis which is transverse to the axis of the shaft 28, as shown by the smaller arrows. Then in FIGURE 5c, the block 38 is again pivoted to a further position as shown, and the guide channel 38 is accordingly pivoted to a position of increased angular inclination or skewness with respect to the longitudinal axis of the shaft 28. In this position of the guide channel 35, the degree of constraint upon the shaft 28 is greater, and consequently, the path of arcuate movement (as shown by the arrows) is more pronounced. Then in FIGURE 5d, the final position of the block 38 is illustrated, wherein the guide channel 35 is pivoted to its greatest degree of angular inclination, the degree of constraint on the yoke member 27 is at its greatest, and the degree of arcuate movement of the reciprocating shaft 28 is at its greatest. In FIGURES 5b, 5c, and 5d, the respective paths of arcuate motion have been deliberately exaggerated for convenience of illustration and ease of understanding. If the block 38 is again pivoted (in the direction indicated by the arrow) the block 38 will be returned to its original position of FIGURE 5a, and the reciprocating shaft 28 will again exhibit straight up-and-down linear movement.

In FIGURES 5a through 5d, the yoke member 27 and reciprocating shaft 28, to which the saw blade 31 is secured, are illustrated in their lowermost positions corresponding to the end of the downstroke or non-cutting stroke, while the broken lines represent the uppermost positions of the yoke member 27 and saw blade 31. In FIGURES 5b, 5c, and 5d, and on the subsequent upstroke, the blade 31 is brought forwardly into engagement with the work W and is thereafter backed away from the work on the downstroke or non-cutting stroke of the jig saw 10. In each case, however, the arcuate movement of the blade 31 (see FIGURES 5b, 5c, and 5d) is concave when viewed towards the direction of the cut being made in the work, and insofar as the jig saw 10 is stationary, is substantially the same on its upstroke as on its downstroke. If desired, the unit could be simply a "two position" tool, that is, either linear or arcuate movement instead of multiple positions; moreover, suitable indicia (not shown) may be placed on the outer surface of the gear case cover 15 (or other housing) to inform the operator as to the particular motion which will be developed, and this indicia may indicate directly the type of cut or type of job to be performed, as for example, "scroll," "general purpose," "fast cutting," etc. This will facilitate usage of the jig saw 10 by even an inexperienced operator, inasmuch as the tool may be adjusted or attuned to best perform the particular requirements of the job at hand.

Figure 6:
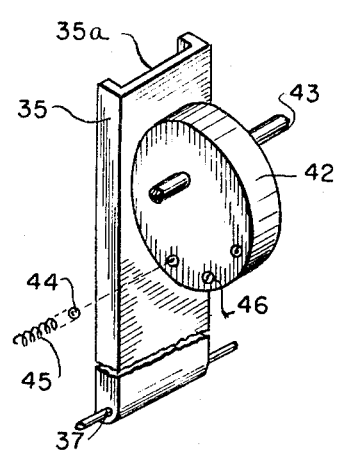
FIGURE 6 is a modification showing an alternate form of shift means.

With reference to FIGURE 6, a modified shift means is illustrated, comprising a rotatable eccentric member 42 mounted upon a pivot pin 43 which in turn may be secured to a suitable external member, such as a lever or knob (not shown) which is similar to the lever 40 of FIGURE 4; the eccentric 42 bears against the back of the channel 35 and may provide an infinite number of adjustments of the pivoted channel 35, or, as shown in FIGURE 6, the eccentric 42 provides a definite number of adjustments by means of a detent connection with the gear case cover 15, comprising a detent member 44, spring 45, and pockets 46 formed in the eccentric 42.

Figure 7:
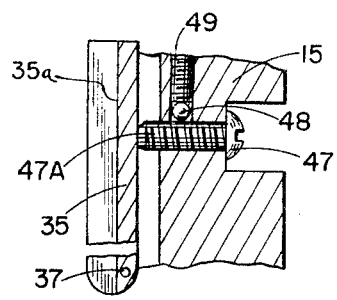
FIGURE 7 is a second modification showing a further alternate type of shift means.

With reference to FIGURE 7, a further modification of the shift means is illustrated, wherein a screw 47 is threadably engaged into the gear case cover 15 along an axis which is substantially perpendicular to the guide channel 35; and the screw 47 has a tip portion 47a which engages the back of the channel 35 and pivots the channel about its pivot pin 37. A pellet 48 of nylon (or other suitable material) is pressed against the threads of the screw 47 by means of a set screw 49 in order to prevent the screw 47 from vibrating or working loose during the operation of the tool; and the screw 47, as distinguished from the block 38, facilitates an unlimited number of adjustments of the pivoted guide channel 35 corresponding to an unlimited number of arcuate paths that may be exhibited by the reciprocating shaft 28.

Obviously, many modifications may be made without departing from the basic spirit of the present invention; and accordingly, within the scope of the appended claims, the invention may be practiced other than has been specifically described herein.

I claim:
1. A variable motion jig saw comprising:
  (a) a housing;
  (b) a pivoted bearing in said housing;
  (c) a shaft journaled in said bearing and ordinarily reciprocating in a linear path;
  (d) a member secured to said shaft within said housing;
  (e) a guide channel for said member, said channel being pivoted at one end thereof within said housing; and
  (f) means to vary the angle of inclination of said channel about its pivot and with respect to the longitudinal axis of said shaft, whereby said channel may be angularly skewed with respect to the axis of said shaft with their respective axes converging towards each other in a direction away from said pivoted bearing, and whereby, if desired, said shaft may be constrained to reciprocate in an arcuate path which is concave when viewed towards the direction of the cut;
  (g) said last-named means to vary the angle of inclination of said channel about its axis, comprising:
    (1) a block pivoted within said housing and having a plurality of faces selectably-engageable against the back of said guide channel above the pivot axis of said channel;
    (2) a pivot pin secured within said block about an axis which is eccentrically disposed with respect to said faces of said block, and which is parallel to the pivot axis of said channel; and
    (3) an external member secured on the end of said pivot pin, whereby, as desired, said shaft may be reciprocated in a linear path or in a plurality of arcuate paths.

2. A variable motion jig saw comprising:
  (a) a housing;
  (b) a pivoted bearing in said housing;
  (c) a shaft journaled in said bearing and ordinarily reciprocating in a linear path;
  (d) a member secured to said shaft within said housing;
  (e) a guide channel for said member, said channel being pivoted at one end thereof within said housing; and
  (f) means to vary the angle of inclination of said channel about its pivot and with respect to the longitudinal axis of said shaft, whereby said channel may be angularly skewed with respect to the axis of said shaft with their respective axes converging towards each other in a direction away from said pivoted bearing, and whereby, if desired, said shaft may be constrained to reciprocate in an arcuate path which is concave when viewed towards the direction of the cut;
  (g) said last-named means to vary the angle of inclination of said channel about its axis, comprising:
    (1) a screw threadably received within said housing and having a tip portion which engages the back of said guide channel above said pivot axis of said channel;
    (2) said screw being externally accessible and being advanced or retracted with respect to said housing.

3. A variable motion power-driven tool comprising:
  (a) a housing;
  (b) a pivoted bearing in said housing;
  (c) a reciprocating shaft member journaled in said bearing and extending beyond the housing;
  (d) power-driven means for reciprocating said shaft in the general direction of the longitudinal axis of the shaft;
  (e) constraining guide means between the shaft and the housing, thereby forcing the shaft to reciprocate in a slightly arcuate path;
  (f) said constraining guide means comprising a pair of members, one carried by the shaft and the other mounted in the housing;
  (g) said members being in constant bearing engagement for relative sliding movement therebetween, and at least one of said members providing a guide track for the other member; and
  (h) means including a threaded element, accessible externally of the housing and having a portion engaging one of the members, for changing the angular position of the guide track relative to longitudinal axis of the shaft;
  (i) whereby an unlimited number of adjustments is provided in the degree of constraint exerted by the guide means on the shaft, and whereby the shaft may reciprocate in an unlimited number of arcuate paths.

References Cited by the Examiner
UNITED STATES PATENTS
3,236,111   2/1966   Naslund _____ 74—50

FRED C. MATTERN, JR., *Primary Examiner.*

F. E. BAKER, *Assistant Examiner.*